United States Patent
Yuan

(10) Patent No.: US 9,992,817 B2
(45) Date of Patent: Jun. 5, 2018

(54) WIRELESS DATA PROCESSING IN A CONNECTED VEHICLE

(71) Applicant: Honda Motor Co., Ltd., Tokyo (JP)

(72) Inventor: Alvin T. Yuan, Carson, CA (US)

(73) Assignee: Honda Motor Co., Ltd., Tokyo (JP)

(*) Notice: Subject to any disclaimer, the term of this patent is extended or adjusted under 35 U.S.C. 154(b) by 107 days.

(21) Appl. No.: 15/131,634

(22) Filed: Apr. 18, 2016

(65) Prior Publication Data

US 2017/0303332 A1 Oct. 19, 2017

(51) Int. Cl.
*H04W 76/16* (2018.01)
*H04B 1/3822* (2015.01)
*H04W 76/02* (2009.01)

(52) U.S. Cl.
CPC .......... *H04W 76/16* (2018.02); *H04B 1/3822* (2013.01); *H04W 76/026* (2013.01)

(58) Field of Classification Search
CPC ... H04W 76/026; H04W 76/16; H04B 1/3822
See application file for complete search history.

(56) References Cited

U.S. PATENT DOCUMENTS

| 8,457,546 B2 | 6/2013 | Mahajan et al. |
| 8,767,772 B2 | 7/2014 | Masputra et al. |
| 2006/0121894 A1 | 6/2006 | Ganesan |
| 2013/0185072 A1 | 7/2013 | Huang et al. |

FOREIGN PATENT DOCUMENTS

| CN | 101621759 | 1/2010 |
| WO | 2011149533 | 12/2011 |
| WO | 2015019234 | 2/2015 |

*Primary Examiner* — Walter J Divito
(74) *Attorney, Agent, or Firm* — Rankin, Hill & Clark LLP

(57) ABSTRACT

A computer-implemented method for wireless vehicle data processing includes processing data requests from a communication device in a vehicle over a network using a first connection established between the communication device and an off-board server. Further, the method includes detecting a connectivity error between the communication device and the off-board server based on the first connection and detecting a second connection different than the first connection. A connection protocol type is identified for the second connection and processing of the data requests are resumed over the network via the second connection for a predetermined period of time based on the connection protocol type of the second connection.

16 Claims, 7 Drawing Sheets

WIRELESS DATA PROCESSING IN A CONNECTED VEHICLE

BACKGROUND

With advances in connected vehicle technology, it is desirable to have access to networks while a vehicle moves. In particular, a reliable connection while driving in a vehicle is typically necessary for performing certain connected vehicle functions. For example, processing speech data (e.g., voice commands) from a user inside a vehicle using an off-board server requires a reliable connection. Further, some data processing can be processed using different types of communication protocols. For example, cellular communication protocols and Wi-Fi communication protocols can be used in a connected vehicle to establish connections and communicate data via networks to other devices. Data processing for different protocols can have different requirements. To maintain connections, communication and processing of data while a vehicle moves, a vehicle can manage different types of connections and therefore prevent delays in data processing.

BRIEF DESCRIPTION

According to one aspect, a computer-implemented method for vehicle data processing includes processing data requests from a communication device in a vehicle over a network using a first connection established between the communication device and an off-board server. The processing includes transmitting data request packets over the network using the first connection to the off-board server and receiving data response packets over the network using the first connection from the off-board server. The method includes detecting a connectivity error between the communication device and the off-board server based on the first connection and detecting a second connection different than the first connection. Further the method includes identifying a connection protocol type of the second connection and resuming processing of the data requests over the network via the second connection for a predetermined period of time based on the connection protocol type of the second connection.

According to another aspect, a system for vehicle data processing includes a communication device operably connected for computer communication with a processor, a network interface controller, and a vehicle. The network interface controller establishes a first connection to an off-board server, the first connection having a first connection protocol type. The network interface controller executes transmission of data request packets to the off-board server using the first connection. Further, the data request packets including components of a data request received in the vehicle by the communication device. The network interface controller detects a connectivity error between the communication device and the off-board server and establishes a second connection between the communication device and the off-board server. Further, the communication device determines a second connection protocol type of the second connection and controls the network interface controller to resume transmission of the data request packets to the off-board server for a predetermined period of time based on the connection protocol type of the second connection.

According to a further aspect, a computer-implemented method for vehicle data processing includes transmitting speech data packets over a network between a communication device of a vehicle and a speech recognition server using a first connection and identifying a connection protocol type of the first connection. Further, a connection state is set based on the connection protocol type of the first connection. An interface of the communication device controls the first connection between the communication device and the speech recognition based on the connection state.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
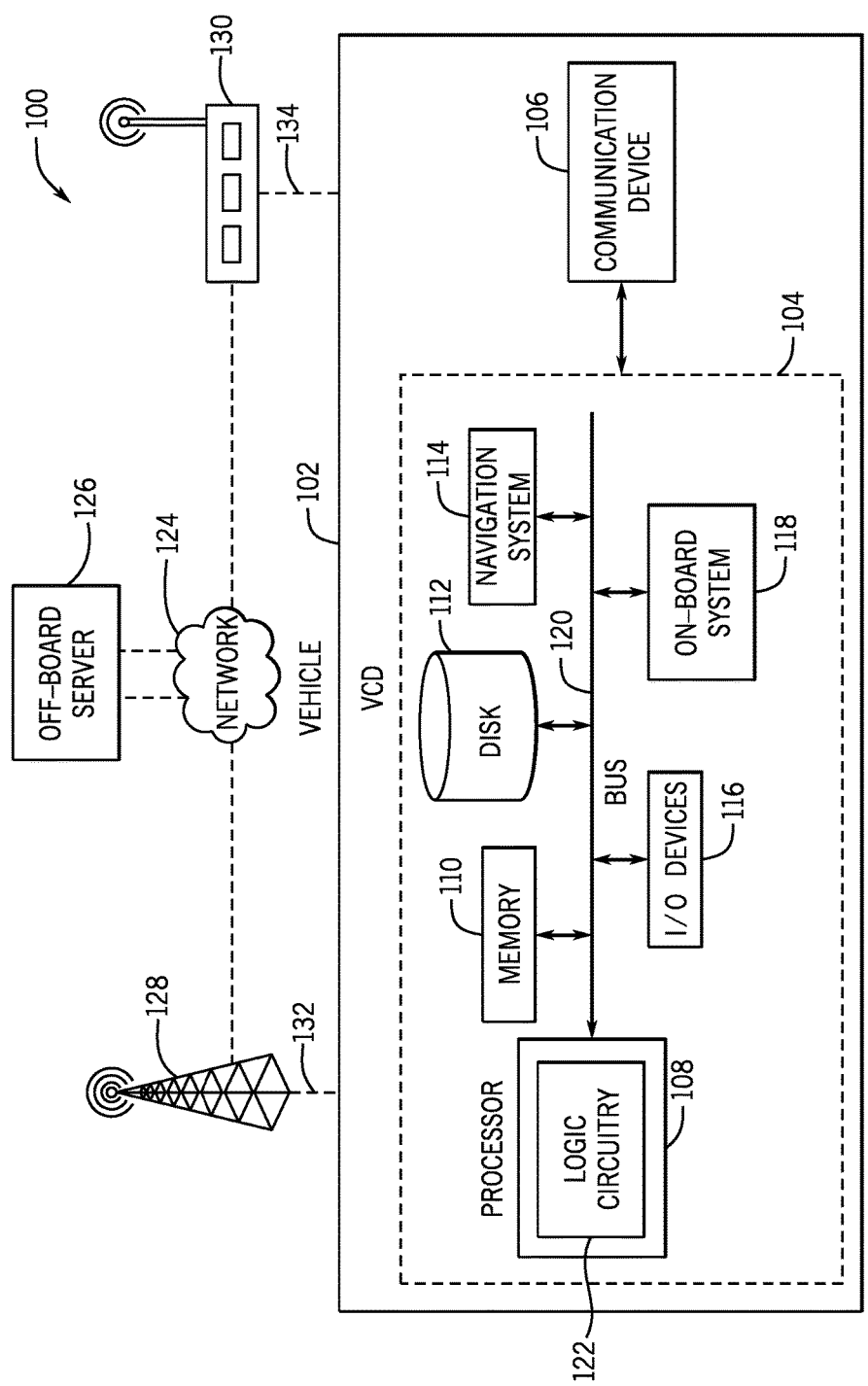
FIG. 1 is a schematic diagram of an exemplary operating environment for wireless data processing in a connected vehicle in accordance with one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into organized into different architectures.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, or plug and play devices. An "output device" includes, but is not limited to: display devices, and other devices for outputting information and functions.

A "logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Further, logic circuitry can include a microprocessor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures. The processor can include logic circuitry execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "wearable computing device", as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Some wearable computing devices have user input and output functionality. Exemplary wearable computing devices can include, but are not limited to, watches, glasses, clothing, gloves, hats, shirts, jewelry, rings, earrings necklaces, armbands, shoes, earbuds, headphones and personal wellness devices.

Referring now to the drawings, wherein the showings are for purposes of illustrating one or more exemplary embodiments and not for purposes of limiting the same, FIG. 1 is a schematic view of an exemplary operating environment for implementing systems and methods for wireless vehicle data processing in accordance with one exemplary embodiment. As can be seen in FIG. 1, an environment 100 can include various components. The components of the environment 100, as well as the components of other systems, hardware architectures, and software architectures discussed herein, can be combined, omitted, or organized into different architectures for various embodiments.

Generally, the environment 100 shown in FIG. 1 includes a vehicle 102 (e.g., a connected vehicle) including a vehicle computing device (VCD) 104 with provisions for processing, communicating and interacting with various components of the vehicle 102 and components of the environment 100. In one embodiment, the components and functions of the VCD 104 can be implemented along and/or in conjunction with another device, for example a communication device 106. In FIG. 1, the communication device 106 can be, for example, a telematics control unit (TCU) or a portable device, operably connected for computer communication to the VCD 104. In the exemplary embodiments discussed herein, the communication device 106 provides software and hardware to facilitate data input and output between the components of the VCD 104 and other components of the environment 100.

Generally, the VCD 104 includes a processor 108, a memory 110, a disk 112, a navigation system 114, input/output (I/O) devices 116 and an on-board system 118, which are each operably connected for computer communication via a bus 120 and/or other wired and wireless technologies. The processor 108 includes logic circuitry 122 with hardware, firmware, and software architecture frameworks for facilitating data processing with the components of the environment 100. Thus, in some embodiments, the logic circuitry 122 can be hardware including a processor, storing application frameworks, kernels, libraries, drivers, application program interfaces, among others, to execute and control hardware and functions discussed herein. Further, in some embodiments, the memory 110 and/or the disk 112 can store similar components of the logic circuitry 122 for execution by the logic circuitry 122 and the processor 108.

The navigation system 114 can include a GPS-based electronic system that provides a real-time map of the vehicle's current location as well as step-by-step directions to a requested destination. The navigation system 114, in some embodiments, can be located in the communication device 106. The I/O devices 116 can include audio I/O devices, for example, a microphone and/or a speaker. The I/O devices 116 can receive input of speech requests and/or voice commands. Further, the on-board system 118, in some embodiments, can include components for processing speech (e.g., received in the vehicle 102 from the I/O devices 116), for example, speech recognition systems and methods. Thus the on-board system 118, in some embodiments, can determine a meaning of the speech request (e.g., a voice command) received at the vehicle 102 (e.g., from I/O devices 116 and/or the communication device 106).

As shown in FIG. 1, the VCD 104 is also operably connected for computer communication to a network 124. The network 124 facilitates connection and bi-directional communication between the vehicle 102 (e.g., the communication device 106) and an off-board server 126. In one embodiment, the off-board server is a speech recognition server for processing data requests (e.g., speech data requests) from the vehicle 102 and/or the communication device 106. To connect to the off-board server 126 via the network 124, various types of wireless connection protocols can be used. For example, as shown in FIG. 1, a connection to the off-board server 126 can be made between the vehicle 102 and the off-board server 126 via the network 124 using a cellular communication protocol type facilitated by a cellular (e.g., carrier) communication network 128. A cellular communication protocol type can include, for example, CDMA, GSM, LTE, among others. In another embodiment, a connection to the off-board server 126 can be made between the vehicle 102 and the off-board server 126 via the network 124 using a Wi-Fi communication protocol type facilitated, for example, by a wireless access point 130. A Wi-Fi communication protocol can include, for example, wireless protocols according to IEEE 802 protocols (e.g., IEEE 802.11, IEEE 802.3, IEEE 802.5, Bluetooth, Zigbee, WIMAXI, RFI), radio links, among others. In FIG. 1, a first connection 132 is shown as having a cellular communication protocol type (via the cellular communication network 128) and a second connection 134 is shown having a Wi-Fi communication protocol type (via the wireless access point 130).

Figure 2:
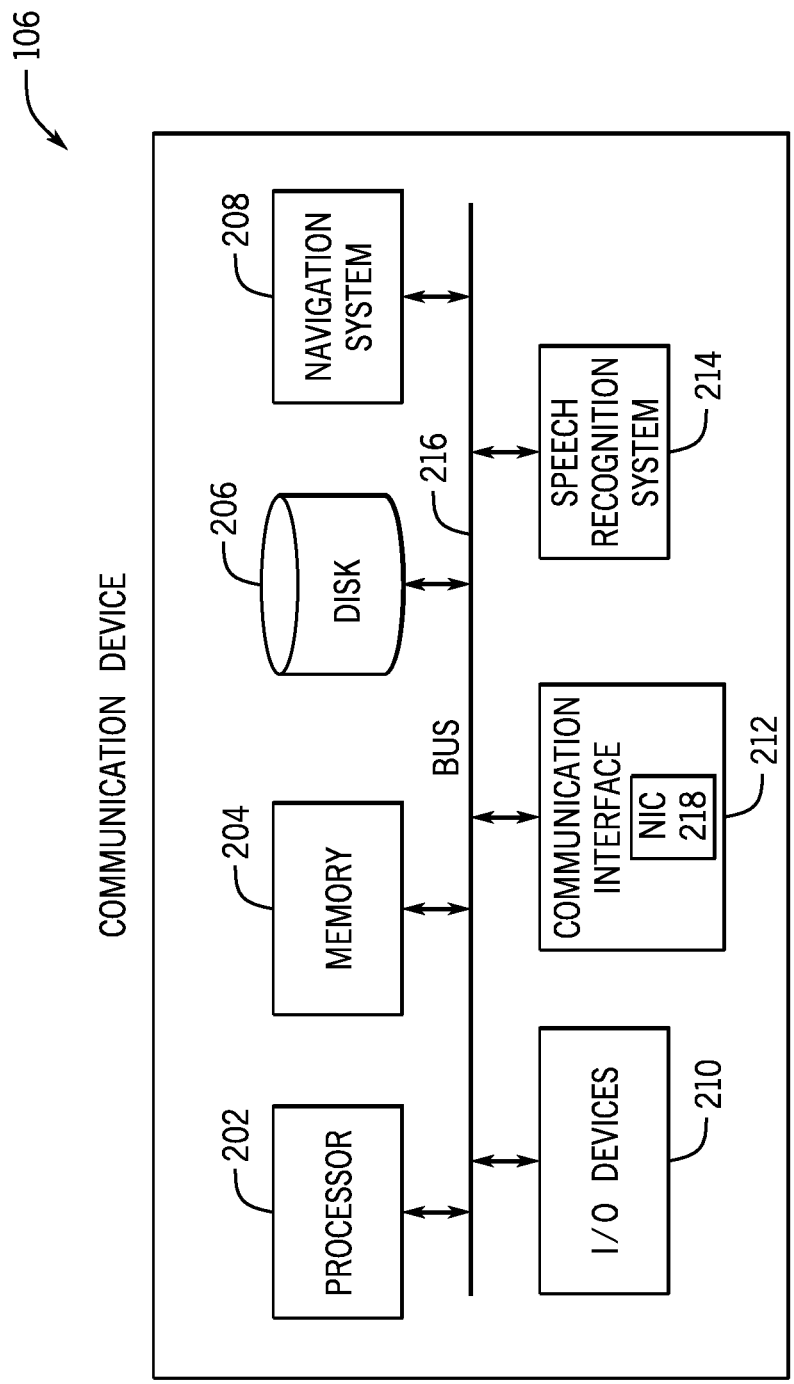
FIG. 2 is an illustrative schematic diagram of the communication device of FIG. 1 in accordance with one embodiment.

The components of the communication device 106 will now be described in more detail with reference to FIG. 2. As shown in FIG. 2, the communication device 106 can include a processor 202, a memory 204, a disk 206, a navigation system 208, input/output (I/O) devices 210, a communication interface 212, and a speech recognition system 214. The components of the communication device 106 as shown in FIG. 2 can provide similar functionality as those components of FIG. 1 with similar component names. For example, the processor 202 can include logic circuitry (not shown). Further, each of the components shown in FIG. 2 can be operably connected for computer communication using, for example, a bus 216. Additionally, the communication interface 212 can include a network interface controller (NIC) 218. The NIC 218 can be hardware (e.g., a card, a circuit board) that manages connections and data transfer between the communication device 106 and other components of the environment 100. For example, the NIC 218 can establish connections, monitor connections, and control bi-directional data communication to, for example, the off-board server 126 via the network 124.

Figure 3:
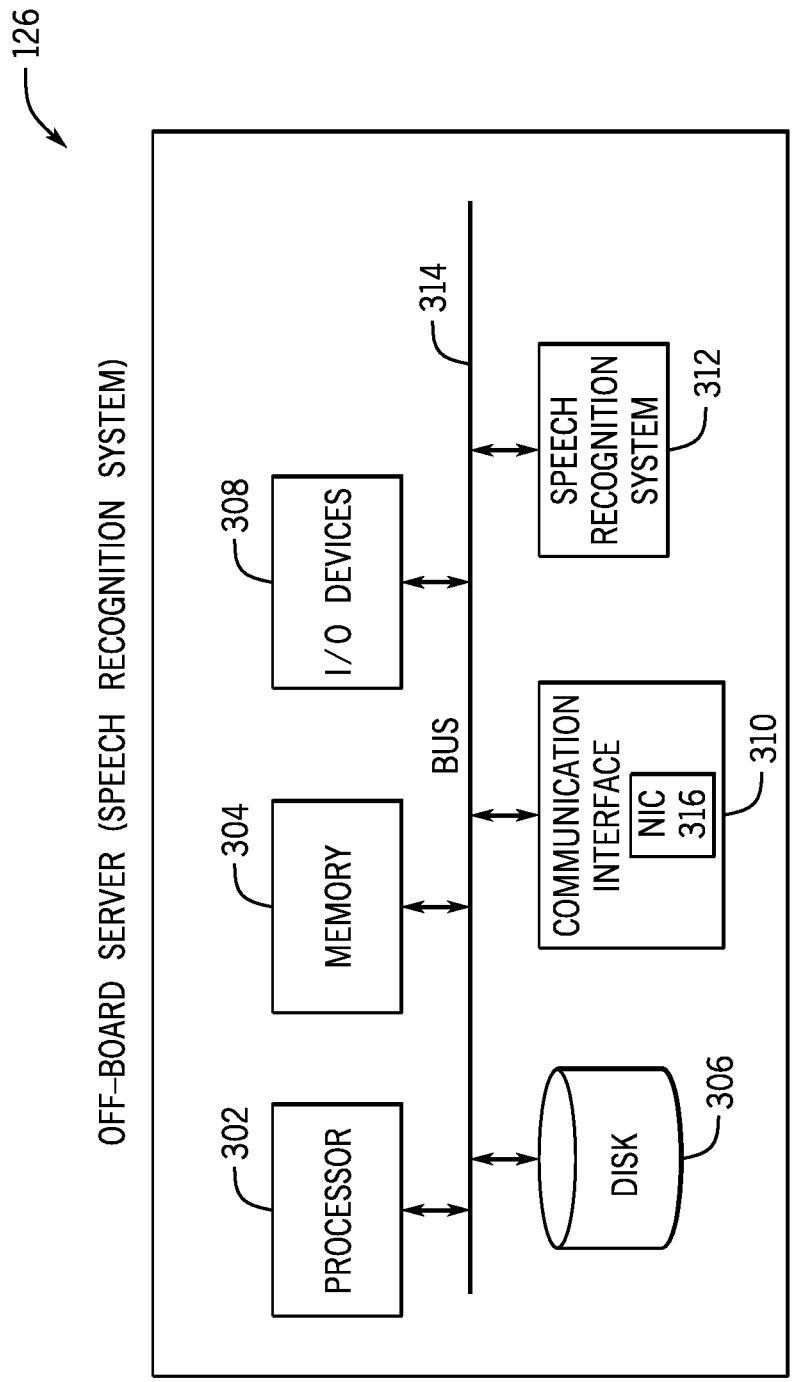
FIG. 3 is an illustrative schematic diagram of the off-board server of FIG. 1 in accordance with one embodiment.

Referring now to FIG. 3, the off-board server (e.g., an off-board speech recognition server) 126 of FIG. 1 will be described in more detail. As shown in FIG. 3, the off-board server 126 can include a processor 302, a memory 304, input/output (I/O) devices 306, a disk 308, a communication interface 310, and a speech recognition system 312. The components of the off-board server 126 as shown in FIG. 3 can provide similar functionality as those components of FIGS. 1 and 2 with similar component names. For example, the processor 302 can include logic circuitry (not shown). Further, each of the components shown in FIG. 3 can be operably connected for computer communication using, for example, a bus 314. Additionally, similar to FIG. 2, the communication interface 310 can include a network interface controller (NIC) 316. The NIC 316 can be hardware (e.g., a card, a circuit board) that manages connections and data transfer between the off-board server 126 and other components of the environment 100. For example, the NIC 316 can establish connections, monitor connections, and control bi-directional data communication to, for example, between the off-board server 126 and the vehicle 106 via the network 124.

Exemplary operation of vehicle data processing with respect to the environment 100 of FIG. 1 will now be described in more detail with reference to FIGS. 1-3. As discussed above, the communication device 106 is operably connected for computer communication with the processor 202, the NIC 218 and the vehicle 102. In some embodiments, functions of the processor 202 can be implemented in whole and/or in part with the processor 108. Thus, the communication device 106 can be operably connected for computer communication to the processor 108.

In one embodiment, the NIC 218 establishes a first connection to the off-board server 126 via the network 124. For example, the first connection 132 shown in FIG. 1. The first connection 132 is a bi-directional connection between the communication device 106 and the off-board server 126 via the network 124 allowing for communication of data (e.g., data request packets, data response packets, speech request packets, speech response packets) between the communication device 106 and the off-board server 126. As discussed above, the first connection 132 can have a first connection protocol type. In FIG. 1, the first connection protocol type is a cellular communication protocol, however, the first connection 132 can have another connection protocol type, for example, a Wi-Fi communication protocol.

The NIC 218 can establish the first connection 132 in conjunction with the NIC 316. Thus, NIC 218 can establish a connection (e.g., the first connection 132) with the NIC 316 thereby creating a b-directional connection between the communication device 106 and the off-board server 126 via the network 124. Further, the NIC 218 can manage processing (e.g., transmission and receipt) of data request packets to the off-board server 126 using, for example, the first connection 132. The data request packets can include components of a data request received in the vehicle 102 by the communication device 106. The data requests and data request packets can be of different data types. For example, a data request can include a request for data for an application, for example, to download an application and/or upload an application stored at vehicle 102 and/or the communication device 106. Thus, processing of these data requests can include transmitting a data request to the off-board server 126 and receiving a data response (e.g., download and/or update of data). In other embodiments, the data request type can be speech data. For example, spoken utterances (e.g., by a user (not shown)) in the vehicle 102 received by the I/O devices 116 can be transmitted to the off-board server 126 for speech recognition. A speech data response can be received by the communication device 106. In a further embodiment, the data request type can be a voice data, for example, a voice call a voice over internet protocol, among others.

As discussed above, in one embodiment, the data request packets are speech data request packets. The speech data request packets are components extracted from a speech data request received by the communication device 106 from a vehicle system (e.g., the I/O devices 116) of the vehicle 102. For example, a speech data request (e.g., a spoken utterance from a user (not shown) in the vehicle 102) can be received by the I/O devices (e.g., a microphone) 116 and transmitted from the I/O devices 116 to the communication device 106. In some embodiments, the speech data request can be received by the I/O devices 210 of the communication device 106.

In some embodiments, the on-board system 118 and/or the speech recognition system 214 can process the speech data request and/or speech data request packets, for example, extract data (e.g., words) from the speech data requests. The speech recognition system 214 and/or the NIC 218 can packetize the extracted data into speech data request packets and the NIC 218 can transmit the speech data request packets to the off-board server 126. As discussed above, in some embodiments, the off-board server 126 is a speech recognition server that performs speech recognition processing on the speech data requests packets. Thus, the off-board server 126 can transmit a speech data response and/or speech data response packets to the communication device 106 and the communication device 106 can process and output the speech data response to, for example, the I/O devices (e.g., a speaker) 116. In some embodiments, as will be discussed herein, processing the data requests can include storing the data requests at the off-board server 126 for a predetermined period of time.

In one embodiment, the NIC 218 can detect a connectivity error (e.g., a connectivity issue) between the communication device 106 and the off-board server 126. A connectivity error can indicate a connectivity issue between the communication device 106 and the off-board server 126, for example, based on the first connection 132. For example, a connectivity issue can indicate that the connection is disabled, disconnected, timed out, has poor quality, has slow data transmission speeds, or indicates another type of error/connection failure that can prevent and/or delay processing (e.g., transmission and/or receipt) of the data. In one embodiment, logic circuitry 122 (e.g., included with the processor 108 and/or the processor 202) can facilitate detection of the connectivity error. For example, a connectivity manager object (not shown) of an API included with a framework stored by the logic circuitry 122 can provide functions for managing connectivity. For example, the connectivity manager object can manage a list of configured/available connections and networks, currently active connections/networks, the current state of connections/network, Wi-Fi access point scans, among others.

Thus, in one embodiment, the logic circuitry 122 can detect connectivity errors by determining a current state of the connections and/or network using the NIC 218. Upon detecting the connectivity error, the NIC 218 can establish a second connection between the communication device 106 and the off-board server 126. For example, in FIG. 1, a second connection 134 can be established. The second connection 134 can be discovered by the logic circuitry 122 (e.g., using the connectivity manager object) and information about the second connection 134 can be transmitted to the NIC 218 thereby enabling the NIC 218 to establish a connection via the second connection 134.

The communication device 106 can also determine a second connection protocol type of the second connection. In some embodiments, this determination can be made by the logic circuitry 122, for example, using the connectivity manager object. As discussed above, the second connection 134 can have a second connection protocol type. In FIG. 1, the second connection protocol type is a Wi-Fi communication protocol, however, the second connection 134 can have another connection protocol type. Thus, in some embodiments, the first connection protocol type is a cellular communication protocol and the second connection protocol type is a Wi-Fi communication protocol. However, in other embodiments, the first connection protocol type is a Wi-Fi communication protocol and the second connection protocol type is a cellular communication protocol.

Based on the second communication protocol type, the communication device 106 can control the NIC 218 to resume processing and/or transmission of the data request packets to the off-board server 126 using the second connection 134. The processing and/or transmission can be for a predetermined period of time, determined by the communication device 106 and based on the connection protocol type of the second connection 134.

For example, in one embodiment, upon the communication device 106 determining the second connection protocol type as a Wi-Fi communication protocol, the NIC 218 resumes transmission of the data request packets until the communication device 107 determines a connectivity error between the communication device 106 and the off-board server 126 based on the second connection 134. For example, the NIC 218 can determine that the second connection 134 has been disabled, and thus, the NIC 218 stops processing (e.g., transmission and/or receipt) of the data request packets. In another embodiment, upon identifying the connection protocol type of the second connection 134 is a Wi-Fi communication protocol, the NIC 218 disables the first connection 132 and establishes the second connection 134 to the off-board server 126.

In one embodiment, the predetermined period of time can be based on user preferences stored, for example at the memory 110 and/or the disk 112. The user preferences can be received by the I/O devices 116 from user input. Thus, in one embodiment, based on the connection protocol type and a data request type, a user can have specific preferences on how processing is managed (e.g., a length of for processing, whether processing is allowed). As discussed above, a data request type can include application data, speech data, and voice data, among others. Table 1, shown below illustrates exemplary user preference data.

TABLE 1

| Connection Protocol Type | Data Request Type | Predetermined Period of Time |
| --- | --- | --- |
| Wi-Fi | Application data | Unlimited |
| Wi-Fi | Speech data | Unlimited |

TABLE 1-continued

| Connection Protocol Type | Data Request Type | Predetermined Period of Time |
| --- | --- | --- |
| Cellular | Speech data | 3 minutes |
| Cellular | Application Data | 0 |

As an illustrative example, if the communication device 106 determines the connection protocol type is Wi-Fi and the data request type is application data, the communication device 106 can query the user preference data to determine a predetermined period of time for processing based on the connection protocol type and the data request type. Based on the examples in Table 1, the user allows for unlimited processing of application data (e.g., upload/download of data to and from an application to an off-board server) and unlimited processing of speech data if the connection protocol type is Wi-Fi. Otherwise, if the communication protocol type is cellular, the user has limits on data processing.

The predetermined period of time for processing can be based on other types of criteria. For example, a user can allow processing of data for a period of time until the data transfer reaches a specific amount of data (e.g., 3 GB). In other embodiments, the user can allow processing data for a period of time until a trigger event is detected, for example, detection of a connectivity error.

As discussed above, the vehicle 102 and/or the communication device 106 can include a navigation system, for example the navigation system 114 and/or the navigation system 208. Thus, in one embodiment, a navigation system is operably connected for computer communication to the communication device 106. The navigation system, in one embodiment, can identify one or more Wi-Fi access points (e.g., wireless access point 130) along a predicted travel path of the vehicle based on location data of the vehicle 102. The Wi-Fi access points can implement another type of wireless connectivity, for example, as discussed above, Bluetooth, Zigbee, among others. Although Wi-Fi access points are used in the examples discussed herein, other types of wireless access points can be used.

In another embodiment, the logic circuitry 122 can identify one or more Wi-Fi access points based on the predicted travel path and/or the location of the vehicle 102 received from the navigation system 114. For example, the connectivity manager object can facilitate Wi-Fi access point scans and/or query previously stored access point data to identify the one or more Wi-Fi access points. In one embodiment, the Wi-Fi access points are identified based on availability and/or permissions to connect to the Wi-Fi access point. For example, availability and/or permissions to connect to the Wi-Fi access point can be based on previously stored access point data and previously stored user preference data.

Thus, the identification of the one or more Wi-Fi access points can be based on previously stored access point data (not shown). The data for each access point can include a location of the access point. The previously stored access point data can be stored, for example, at the memory 110 and/or the disk 112 (e.g., in a database). In one example, the database can be populated with known Wi-Fi access points at the time of manufacture of the vehicle and the vehicle (e.g., the navigation system 114) can detect new Wi-Fi access points as the vehicle travels which can be stored and/or updated in the database. The Wi-Fi access points are stored with the location of the Wi-Fi access points so that as the vehicle travels, Wi-Fi access points can be identified along the travel path of the vehicle based on the location of the vehicle along the travel path. The previously stored access point data can include any information associated with the Wi-Fi access point. Exemplary information can include, for example, whether the Wi-Fi access point requires a password/and or subscription, a user password associated with the Wi-Fi access point, an encryption type, and a provider of the Wi-Fi access point, among others. Table 2, shown below, is an exemplary table showing previously stored access point data.

TABLE 2

| Access Point ID | Location | Password Required? | User Password | Encryption Type | Provider |
|---|---|---|---|---|---|
| 404A | 41.41, −81.83 | YES | 1234 | WEP | Coffee Shop |
| 404B | 41.48, −81.70 | NO | N/A | WPA | Restaurant |
| 404C | 41.44, −81.85 | NO | N/A | WPA2 | Library |
| 404D | 41.45, −81.86 | YES | N/A | WPA | Retail Store |

As an illustrative example, some Wi-Fi access points can require a subscription and/or a password to connect to the Wi-Fi access point. Accordingly, the communication device 106 can identify the one or more Wi-Fi access points by querying the previously stored access point data for user preference data associated with the one or more Wi-Fi access points. For example, the communication device 106 can query the previously stored access point data for password and/or subscription information about a Wi-Fi access point. If the Wi-Fi access point requires a subscription and/or a password and the subscription and/or password information is not available for said Wi-Fi access point, the communication device 106 can determine that the Wi-Fi access point is not available. In other embodiments, the previously stored access point data can not include password information (e.g., password required and/or user password), since, in some embodiments, publically accessible Wi-Fi access points are available without subscriptions and/or passwords.

Further, the identification of the one or more Wi-Fi access points can be based on user preferences stored, for example at the memory 110 and/or the disk 112. For example, a user can prefer not to utilize access points with certain encryption types and/or providers. Thus, the memory 110 and/or the disk 112 can stored user preference data (not shown). In other embodiments, the previously stored access point data can include the user preference data. In other embodiments, the user preference data can define the preferences for processing data requests, as will be discussed herein. Table 3, shown below, is an exemplary table showing previously stored user preference data. Thus, a user can have preferences for connecting to a specific type of access point. For example, if the encryption type is WEP and speech data is being transmitted using the connection, the user can only allow a connection if a password is required.

TABLE 3

| Encryption Type | Data Request Type | Password Required? | Allow connection? |
|---|---|---|---|
| WEP | Data | Any | YES |
| WEP | Speech | YES | YES |
| WEP | Speech | NO | NO |
| WPA | Data | Any | YES |
| WPA2 | Speech | Any | YES |

Figure 4:
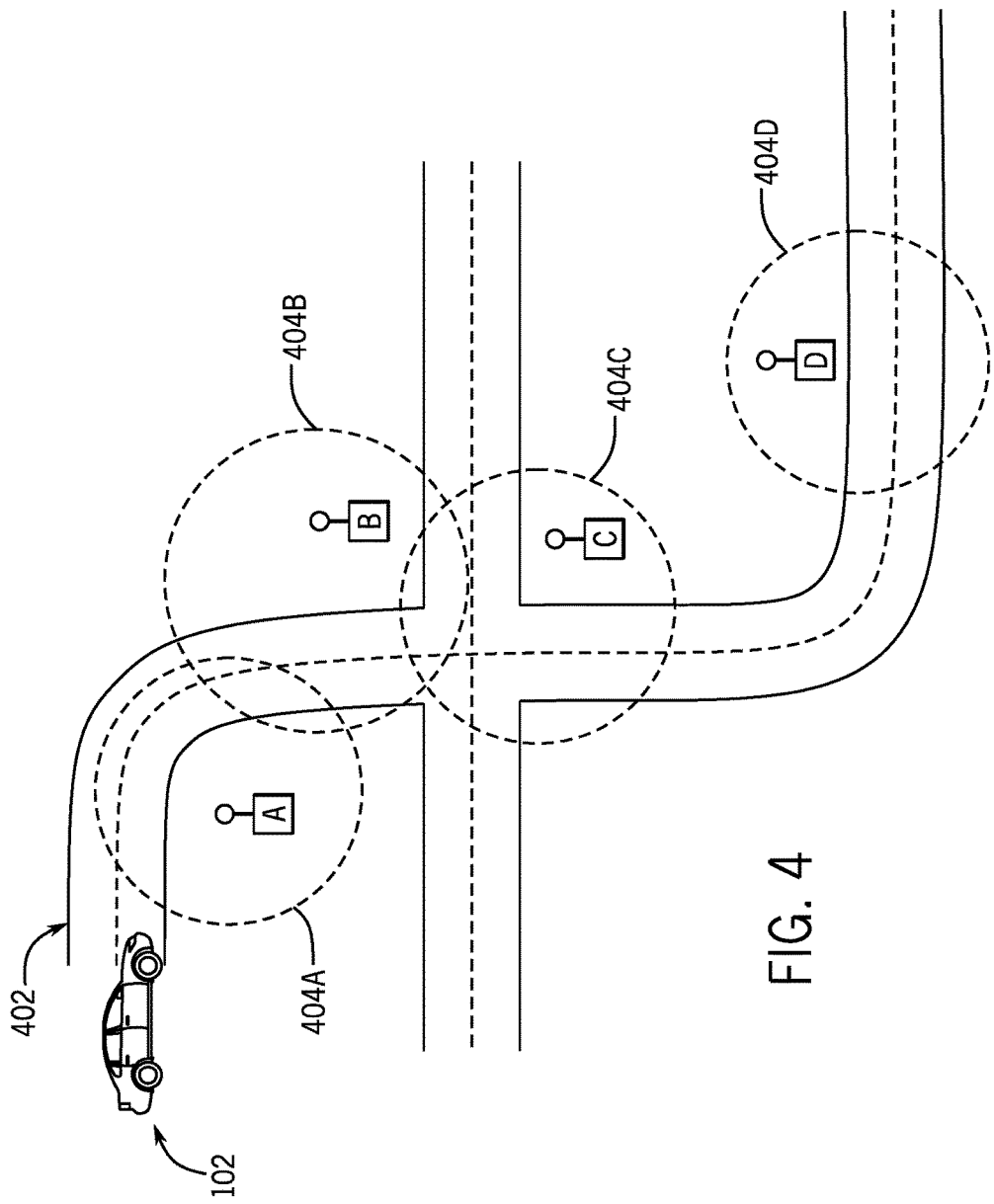
FIG. 4 is an illustrative schematic diagram of the vehicle of FIG. 1 travelling along a road with more than one Wi-Fi access point in accordance with one embodiment.

Identification of one or more Wi-Fi access points will now be discussed with reference to FIG. 4. FIG. 4 illustrates a schematic diagram of the vehicle 102 travelling along a road 402. The vehicle 102 can travel along a predicted travel path upon the road 402 as determined by the navigation system 114. As shown, access points A, B, C and D are positioned along the road 402. Each access point A, B, C, and D has an associated range in which Wi-Fi connectivity can be obtained by each access point, namely, 404A, 404B, 404C, and 404D. The VCD 104 and/or the navigation system 114 can identify the access points A, B, C, and D along the travel path (e.g., along road 402) based on location data provided by the navigation system 114. This allows the communication device 106 to identify potential access points to connect wirelessly for vehicle data processing and handoff vehicle data processing to different access points as the vehicle 102 is travelling along the road 402. Further, as discussed above, the communication device 104 can identify access points based on previously stored access point data and previously stored user preference data.

As an illustrative example, access point 404a can be identified as an access point along a travel route of the vehicle 102. The communication device can query previously stored access point data to determine if the access point 404a is available for connection. For example, access point ID 404A from Table 2 requires a password and a user password is available for access point 404A. However, access point 404D requires a password and a user password is available for access point 404D. Accordingly, the communication device can identify 404A, 404B, and 404C as access points, while 404D is not identified as an access point. Based on this example, as the vehicle 102 travels along the predicted travel path, the communication device 106 can receive services from access points 404A, 404B, and 404C. As the vehicle enters an associated range in which Wi-Fi connectivity can be obtained, the communication device 106 initiates connection and processing using the access point as discussed herein. As the vehicle enters another associated range in which Wi-Fi connectivity can be obtained from a different access point, the communication device 106 sends a handoff request to the different access point and processing continues with the access point.

Figure 5:
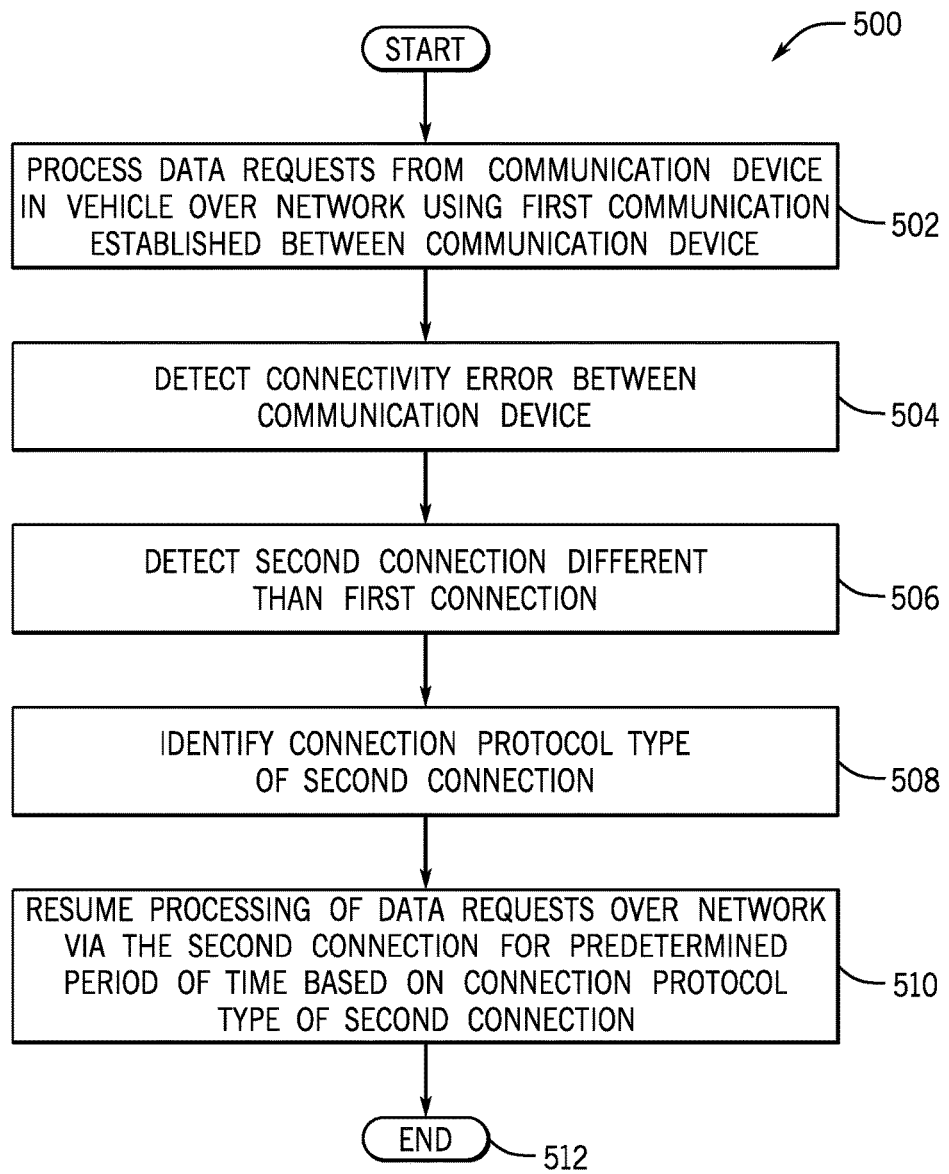
FIG. 5 is a flow chart of an exemplary method for wireless data processing in a connected vehicle in accordance with one embodiment.

Referring now to FIG. 5, an exemplary method 500 for vehicle data processing according to an exemplary embodiment is shown. FIG. 5 will be described with reference to FIGS. 1-4. The method 500 includes at block 502, processing data requests from a communication device in a vehicle over a network using a first connection established between the communication device and an off-board server. The processing can include transmitting data request packets over the network using the first connection to the off-board server and receiving data response packets over the network using the first connection from the off-board server. Thus, with reference to FIGS. 1-3, the communication device 106 and the NIC 218 can control processing of data requests between the communication device 106 in the vehicle 102 over the network 124 using the first connection 132 established between the communication device 106 and the off-board server 126.

In one embodiment, the data requests from the communication device in the vehicle are speech data requests. The speech data request and/or speech data request packets are components extracted from the speech data request received by the communication device 106 from a vehicle system (e.g., I/O devices 116) of the vehicle 102. For example, a speech data request (e.g., a spoken utterance from a user (not shown) in the vehicle 102) can be received by the I/O devices (e.g., a microphone) 116 and transmitted from the I/O devices 116 to the communication device 106. In some embodiments, the speech data request can be received by the I/O devices 210 of the communication device 106.

At block 504, the method 500 includes detecting a connectivity error between the communication device and the off-board server based on the first connection. As discussed above, in one embodiment, the NIC 218 can detect a connectivity error between the communication device 106 and the off-board server 126. For example, detecting the connectivity error can include detecting the connectivity error between the communication device and the off-board server indicating the first connection is disconnected. A connectivity error can indicate a connectivity issue between the communication device 106 and the off-board server 126, for example, based on the first connection 132. For example, a connectivity issue can indicate that the first connection 132 is disabled, disconnected, timed out, poor quality, slow data transmission speeds, or another type of error/connection failure. In one embodiment, logic circuitry 122 (e.g., stored at the processor 108 and/or the processor 202) can facilitate detection of the connectivity error. For example, a connectivity manager object (not shown) of an API included with a framework of the logic circuitry 122 can provide functions for managing connectivity. For example, the connectivity manager object can manage a list of configured/available connections and networks, currently active connections/networks, the current state of connections/network, Wi-Fi access point scans, among others.

At block 506, the method 500 includes detecting a second connection different than the first connection. Thus, the communication device 106 and/or the NIC 218 can discover other available connections (e.g., the second connection 134) to the network 124. For example, the connectivity manager object can identify and/or discover available connections and networks.

Further, at block 508, the method 500 includes identifying a connection protocol type of the second connection. In some embodiments, the method 500 can also include identifying a connection protocol type of the first connection. As discussed above, the second connection 134 can have a second connection protocol type. In FIG. 1, the first connection protocol type is a Wi-Fi communication protocol, however, the second connection 134 can have another connection protocol type. Thus, in some embodiments, the first connection protocol type is a cellular communication protocol and the second connection protocol type is a Wi-Fi communication protocol. However, in other embodiments, the first connection protocol type is a Wi-Fi communication protocol and the second connection protocol type is a cellular communication protocol. Thus, in some embodiments, the connection protocol type of the second connection is different than a connection protocol type of the first connection.

Referring again to the embodiment where the data requests are speech data requests, in one example, a connection protocol type of the first connection is a cellular communication protocol, and processing the data requests includes transmitting speech data packets to an off-board speech recognition server using the first connection. Thus, as shown in FIG. 1, the first connection 132 is a cellular communication protocol established by a cellular communication network 128. The first connection 132 can be used to transmit the speech data packets to the off-board server 126 (e.g., the off-board speech recognition server).

Based on the connection protocol type of the second connection, at block 508, the method 500 includes resuming processing of the data requests over the network via the second connection for a predetermined period of time. Thus, based on the second communication protocol type, the communication device 106 can control the NIC 218 to resume processing and/or transmission of the data request packets to the off-board server 126 using the second connection 134. The transmission can be for a predetermined period of time, determined by the communication device 106, based on the connection protocol type of the second connection 134. For example, in one embodiment, upon determining the connection protocol type of the second connection is a Wi-Fi communication protocol, resuming processing of the data requests includes resuming processing of the data requests for an unlimited period of time.

Figure 6:
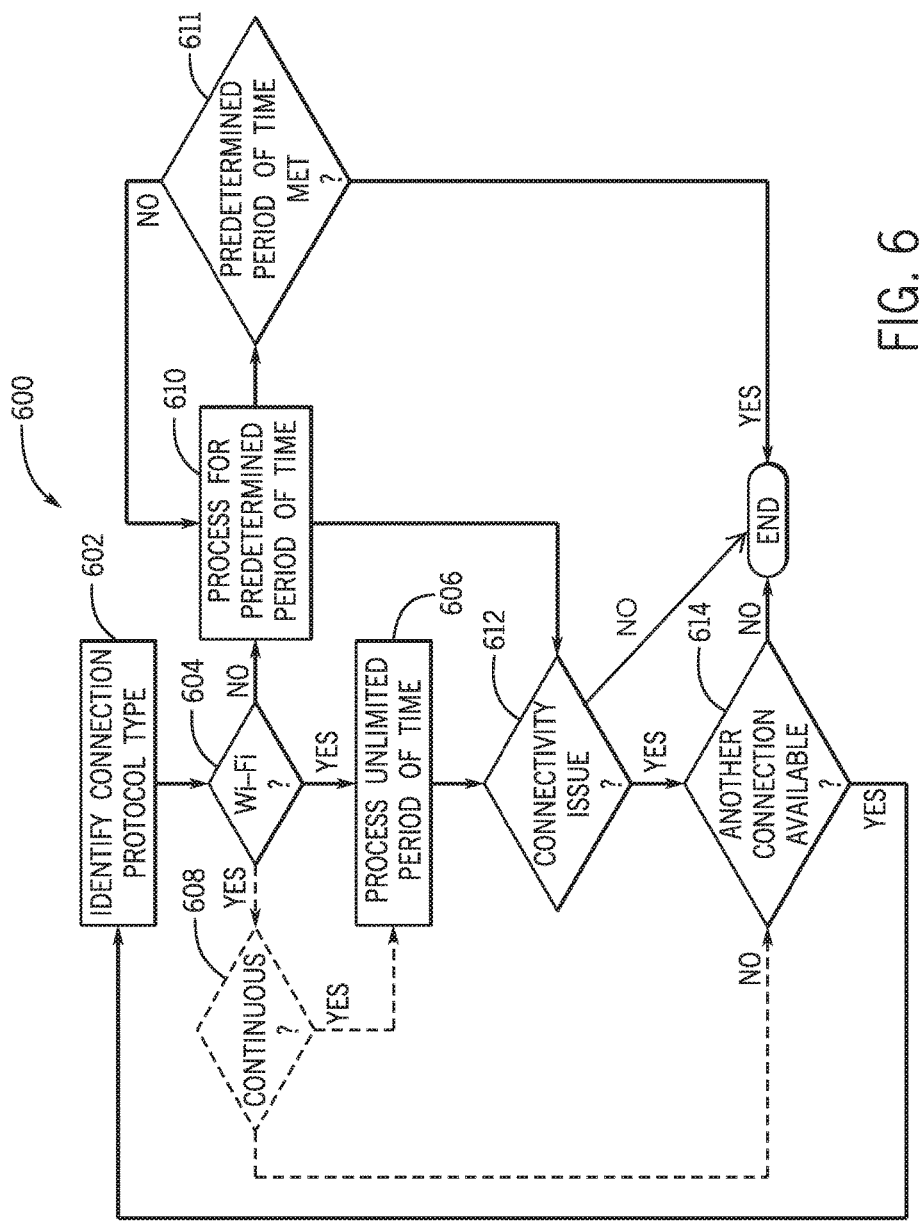
FIG. 6 is a flow chart of an exemplary method for identifying a communication protocol, in accordance with one embodiment.

FIG. 6 illustrates a method 600 according to the method 500 of FIG. 5, specifically, a method for identifying a connection protocol type of the second connection. The method 600 can also be implemented for identifying a connection protocol type of the first connection. Thus, generally, at block 602, the method 600 includes identifying a connection protocol type as discussed above with block 508. At block 604, it is determined if the connection protocol type is a Wi-Fi connection protocol. If YES, at block 606, the method includes processing (e.g., resume processing) of data requests over the network via the connection (e.g., the second connection) for an unlimited period of time.

In an alternative embodiment, at block 608, the method can include determining whether the connection having the Wi-Fi communication protocol type can provide a continuous connection. This determination can be made, in part, based on identifying one or more Wi-Fi access points along the travel path. For example, if Wi-Fi connectivity is not available for the entire travel path, the connection having the Wi-Fi communication protocol type may not be able to provide a continuous connection. Thus, in one embodiment, if the determination at block 608 is NO, the method 600 proceeds to block 614, which will be discussed in further detail herein. However, if Wi-Fi connectivity is available for the entire travel path, then the connection having the Wi-Fi communication protocol type can provide a continuous connection. Thus, if the determination at block 608 is YES, the method 600 process to block 606.

Referring again to block 604, if the determination is NO, the method proceeds to block 610 where the method 600 includes processing (e.g., resume processing) of data requests over the network via the connection (e.g., the second connection) for a predetermined period of time. If the predetermined period of time is met at block 611, the method 600 can end. If the predetermined period of time is not met at block 611, the method 600 continues processing at block 610. In some embodiments, after the predetermined period of time is met at block 611, method 600 can proceed (not shown) to block 614 to determine if another connection is available. As discussed above, the predetermined period of time can be based on the identified connection protocol type and/or user preferences.

In another embodiment, the processing at blocks 606 and 610 can continue either for the predetermined period of time and/or until a connectivity error is determined at block 612. If a connectivity error is determined, then at block 614, it is determined if another connection is available. If YES, the method 600 proceeds to block 602. If NO, the method 600 ends.

Figure 7:
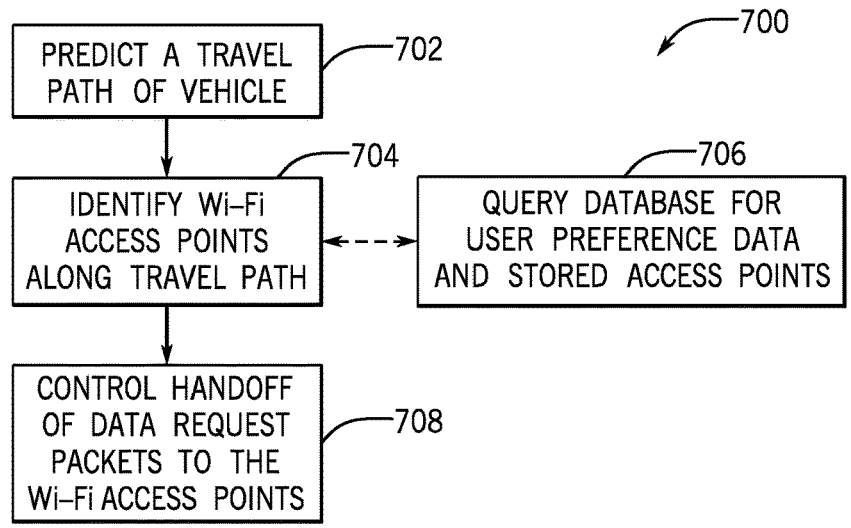
FIG. 7 is a flow chart of an exemplary method for wireless data processing in a connected vehicle while travelling along a predicted travel path in accordance with one embodiment.

Another exemplary embodiment including data request handoffs based on a predicted travel path will now be described with respect to method 700 of FIG. 7. In one embodiment, at block 702, the method 700 includes predicting a travel path for the vehicle based on location data received from the vehicle. As discussed above, the navigation system 114 can provide vehicle location data and a travel path of the vehicle. In one embodiment at block 704, the method 700 can include identifying one or more Wi-Fi access points along the travel path that is based in part on user preference data and stored access point information. In one embodiment, at block 706, the method 700 can include querying a database (e.g. the memory 110, the disk 112) for user preference data and stored access point data.

Accordingly, as discussed at block 510 of FIG. 5, in this embodiment, resuming processing of the data requests for the predetermined period of time includes transmitting speech data packets over the network to the off-board speech recognition server using the second connection and the more than one Wi-Fi access points. Thus, handoff of the data request packets (e.g., the speech data request packets) is managed at block 708. In one embodiment, resuming processing of the data requests for the predetermined period of time includes storing the speech data packets at the off-board speech recognition server for an unlimited period of time. The speech data packets are streamed incrementally to the off-board speech recognition server using the second connection and the more than one Wi-Fi access points. Thus, when a vehicle connects to a Wi-Fi access point, the speech data packets can be stored and/or processed at the off-board speech recognition server. As the vehicle connects to a different Wi-Fi access point, the speech data packets transmitted via the different Wi-Fi access point are also stored and/or processed with the speech data packets streamed from to the first Wi-Fi access point. In this way, the speech recognition sever can continue collecting speech data packets and process the speech data packets as the vehicle moves and changes connections between different Wi-Fi access points.

Figure 8:
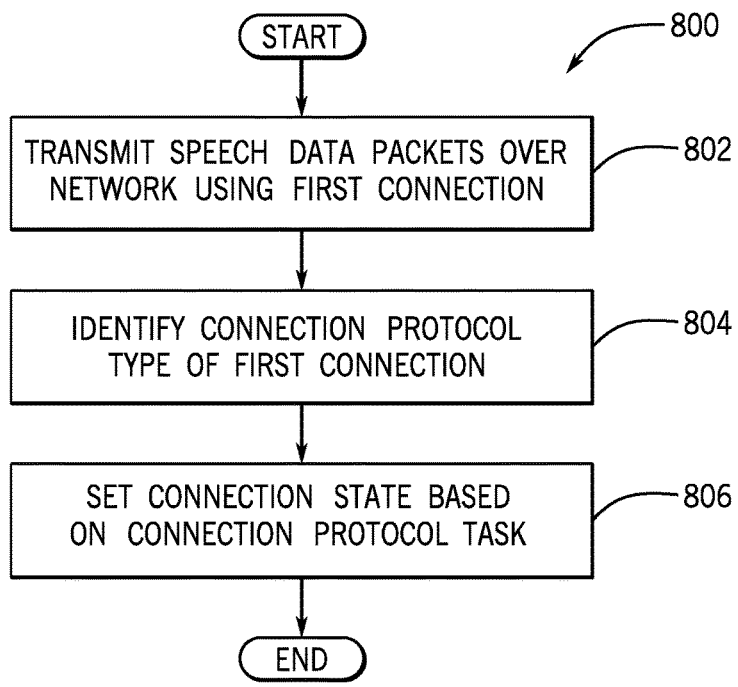
FIG. 8 is a flow chart of an exemplary method for wireless data processing in a connected vehicle in accordance with another embodiment.

Another exemplary embodiment for vehicle data processing will now be discussed with respect to FIG. 8. In FIG. 8, the method 800 includes at block 802, transmitting speech data packets over a network between a communication device of a vehicle and a speech recognition server using a first connection. At block 804, the method 800 includes identifying a connection protocol type of the first connection as discussed herein.

Further, at block 806, the method 800 includes setting a connection state based on the connection protocol type of the first connection. For example, an interface of the communication device controls the first connection between the communication device and the speech recognition based on the connection state. Thus, the NIC 218 of the communication device 106 can set a connection state parameter (e.g., managed, for example, by the connectivity manager object) based on the connection protocol type of the first connection.

For example, in one embodiment, upon determining the connection protocol type of the first connection is a Wi-Fi communication protocol, the connection state is set to active and the NIC 218 of the communication device 106 controls an active connection between the communication device and the speech recognition server using the first connection until a connection change event is received by the communication device. As mentioned with FIGS. 5 and 6, detecting a connection change event can include detecting a connectivity error. In other embodiments, a connection change event can indicate that a second connection is available. In one embodiment, upon determining that the second connection is available, the method can include, identifying a connection protocol type of the second connection, and setting the connection state based on the connection protocol type of the first connection and the connection protocol type of the second connection. Accordingly, the methods and systems discussed herein can provide management of connections and processing of data while a vehicle is moving.

The embodiments discussed herein can also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media can include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations or improvements therein can be subsequently made by those skilled in the art which are also intended to be encompassed by the following claims.

The invention claimed is:

1. A computer-implemented method for vehicle data processing, comprising:
   processing data requests from a communication device in a vehicle over a network using a first connection established between the communication device and an off-board server, wherein the processing includes transmitting data request packets over the network using the first connection to the off-board server and receiving data response packets over the network using the first connection from the off-board server;
   upon detecting a connectivity error between the communication device and the off-board server based on the first connection, detecting a second connection between the communication device and the off-board server, the second connection being different than the first connection;
   identifying a connection protocol type of the second connection;
   determining a predetermined period of time based on the connection protocol type of the second connection; and
   resuming processing of the data requests over the network via the second connection for the predetermined period of time.

2. The computer-implemented method of claim 1, wherein upon determining the connection protocol type of the second connection is a Wi-Fi communication protocol, resuming processing of the data requests includes resuming processing of the data requests until a connectivity error between the communication device and the off-board server based on the second connection is determined.

3. The computer-implemented method of claim 1, wherein the connection protocol type of the second connection is different than a connection protocol type of the first connection.

4. The computer-implemented method of claim 1, wherein the data requests from the communication device in the vehicle are speech data requests and a connection protocol type of the first connection is a cellular communication protocol, and wherein processing the data requests includes transmitting speech data packets based on the speech data requests to an off-board speech recognition server using the first connection.

5. The computer-implemented method of claim 4, wherein detecting the connectivity error includes detecting the connectivity error between the communication device and the off-board server indicating the first connection is disconnected.

6. The computer-implemented method of claim 4, including predicting a travel path for the vehicle based on location data received from the vehicle.

7. The computer-implemented method of claim 6, including identifying one or more Wi-Fi access points along the travel path.

8. The computer-implemented method of claim 7, wherein identifying the one or more Wi-Fi access points along the travel path is based in part on user preference data and stored access point information.

9. The computer-implemented of claim 7, wherein resuming processing of the data requests for the predetermined period of time includes transmitting the speech data packets over the network to the off-board speech recognition server using the second connection and the one or more Wi-Fi access points.

10. The computer-implemented of claim 9, wherein resuming processing of the data requests for the predetermined period of time includes storing the speech data packets at the off-board speech recognition server, wherein the speech data packets are streamed incrementally to the off-board speech recognition server using the second connection and the one or more Wi-Fi access points.

11. A system for vehicle data processing, comprising:
a communication device operably connected for computer communication with a processor, a network interface controller, and a vehicle, wherein the network interface controller establishes a first connection to an off-board server, the first connection having a first connection protocol type, wherein the network interface controller executes transmission of data request packets to the off-board server using the first connection, the data request packets including components of a data request received in the vehicle by the communication device;
wherein the network interface controller detects a connectivity error between the communication device and the off-board server and establishes a second connection between the communication device and the off-board server, wherein the communication device determines a second connection protocol type of the second connection and controls the network interface controller to resume transmission of the data request packets to the off-board server via the second connection for a predetermined period of time determined based on the second connection protocol type of the second connection,
wherein the predetermined period of time is stored in the vehicle.

12. The system of claim 11, wherein upon the communication device determining the second connection protocol type as a Wi-Fi communication protocol, the network interface controller resumes transmission of the data request packets until the network interface controller determines a connectivity error between the communication device and the off-board server based on the second connection.

13. The system of claim 11, wherein the first connection protocol type is a cellular communication protocol and the second connection protocol type is a Wi-Fi communication protocol.

14. The system of claim 11, wherein the data request packets are speech data request packets and the speech data request packets are components extracted from a speech data request received by the communication device from a vehicle system of the vehicle, and wherein the speech request packets are transmitted to an off-board speech recognition server.

15. The system of claim 11, wherein upon identifying the second connection protocol type of the second connection is a Wi-Fi communication protocol, the network interface controller disables the first connection and establishes the second connection to the off-board server.

16. The system of claim 11, further including a navigation system operably connected for computer communication to the communication device, wherein the navigation system identifies one or more Wi-Fi access points along a predicted travel path of the vehicle based on location data and stored access point data.

* * * * *